Patented Oct. 17, 1939

2,176,685

UNITED STATES PATENT OFFICE 2,176,685

MAKING SODIUM CHROMATES

Marvin J. Udy, Niagara Falls, N. Y.

No Drawing. Application November 30, 1937,
Serial No. 177,365

2 Claims. (Cl. 23—56)

This invention relates to the production of chromate compounds and has for an object the provision of certain improvements in methods of producing such compounds. A particular object of the invention is to provide certain improvements in methods of producing sodium bichromate. A further object of the invention is to provide an improved product suitable for use in the production of sodium bichromate.

In accordance with the invention, ferrochromium, in finely divided condition, is oxidized at an elevated temperature below its fusion point in the presence of lime (CaO) and soda ash ($Na_2CO_3$) with the production of calcium chromate and sodium chromate. In operations carried out in accordance with the invention, sodium carbonate is employed in the amount required to form sodium chromate with about half the chromium of the ferrochromium treated, and calcium oxide is employed in amount in excess of the amount required to form calcium chromate with the remainder of the ferrochromium treated. Products formed in accordance with the invention consist essentially of ferric oxide, calcium oxide, sodium oxide and chromium trioxide, sodium oxide and calcium oxide being chemically combined with chromium trioxide in proportions such as to provide substantially equi-molecular amounts of sodium chromate and calcium chromate. The products of the invention may contain relatively small amounts of silica resulting from oxidation of silicon contained in the ferrochromium.

An oxidized product formed in accordance with the invention may be leached to produce an aqueous solution containing sodium chromate and calcium chromate in about equi-molecular proportions and the resulting solution treated with an acid capable of precipitating calcium from solution in order to produce an aqueous solution of sodium bichromate.

In the ordinary and practiced method of making chromates from chromite ore, $FeO.Cr_2O_3$, the ore is fine ground, mixed with a large amount of lime and enough soda ash to form sodium chromate. The mixture is roasted for a long period of time until a substantial amount of the $Cr_2O_3$ is converted to sodium chromate.

Chromite is an unusually refractory mineral and no matter how finely ground it may be, roasting chromite to chromate is a slow and time-consuming operation. Ordinarily a mixture of chromite, lime and soda ash is rabbled on a reverberatory furnace hearth. The conversion of chromite into chromate is never complete and the yield is usually low. Operation is at a bright red heat, usually 1000° C. or above. The main function of the lime in this mixture is physical rather than chemical; it keeps it open and porous to permit access of air. After the roasting operation the mixture is leached to remove sodium chromate from a residue of lime, oxide of iron and ore gangue. The oxidation of $Cr_2O_3$ to $2CrO_3$ is only slightly exothermic and the reaction is slow. Much heat delivered over a long period of time is necessary.

The difficulties inherent in direct oxidation of chromites in natural ores to chromates can be lessened by first reducing the ore to a ferrochromium metal and roasting the metal in finely divided form in admixture with lime in excess to form calcium chromate. The oxidation of metallic chromium, and of the iron accompanying it, are both highly exothermic and the amount of heat required in firing is not great. But, as it happens in this roasting operation conversion is slow. Much time is required for adequate yields of chromate. Even with addition of oxidation catalysts, the action requires heating for several hours. Furthermore the leaching of calcium chromate from the furnace product requires much time. Dilute sulfuric acid is often used to increase the leaching recovery but involves extra cost since all CaO must be converted to sulfate. This process, while an improvement, does not overcome all the disadvantages of roasting chromite to chromate.

I have discovered that both the oxidation of chromium to chromate and the recovery of chromate in leaching are greatly facilitated by the presence in the roasting mixture of relatively large proportions of soda (soda ash), the amount being about half that required to form a chromate with all the chromium present. With such an addition of soda ash to the finely powdered mixture of ferrochromium and lime, in about this amount, the oxidation of both chromium and iron proceeds with great velocity, going practically to completion. The exothermic reactions are so vigorous and rapid that the temperature rises almost automatically with formation of sodium and calcium chromates and ferric oxide. The reaction starts at 700° to 800° C. and is completed below 1000° C. But little outside heat need be applied. The excess of lime keeps the roasting mixture pervious to the air and absorbs heat. Usually oxidation of the chromium of the alloy to $CrO_3$ is nearly complete in less than one half hour. The $CrO_3$ goes into solution on leaching partly as sodium chromate and partly as calcium chromate. On leaching with water, soluble chromate is readily recovered with small expenditure of time and with large apparatus capacity. Both the roasting and the leaching are rapid as compared with any prior method.

Ferrochromium of commercial grades has a high chromium content; the ratio of chromium to iron being ordinarily above 60:40. Few American ores give this ratio and imported ores are ordinarily employed in making the ferrochromium of the market. However, for my purposes, high grade ferrochromium is not necessary or particularly advantageous; I can use the chromium-iron alloy resulting from the total reduction of any chromite ore of reasonable purity, more or less irrespective of the ratio of chromium and iron. Cheap ores containing much iron serve well. Ferrochromium high in iron, made from the low grade ores, is advantageous in roasting the chromate.

In roasting ferrochromium and like alloys the action is, as stated, highly exothermic and in making chromate from such alloys there is an important saving in time and heat. Most of these chromium alloys are high in carbon and, as produced, are brittle. No great expenditure of power is required to convert them into a fine-mesh powder. In the roasting operation, the carbon contained in the alloy adds somewhat to the development of heat.

In practical embodiments of my invention I mix a fine powdered high carbon ferrochromium with lime and with soda (soda ash) in about the proportion equivalent to half the chromium. The resultant roasted product then contains sodium chromate and calcium chromate in about equimolecular proportions. More lime than corresponds to this proportion is useful in keeping the mixture pervious, in holding the temperature below 1000° and also in taking care of silica formed from silicon present in the alloy. Alloys produced by direct total reduction of chromite ores often also contain silicon as well as carbon. The oxidation reaction completes itself well below 1000° C. At higher temperatures there is reversion of chromate to chromite.

The mixture is roasted and rabbled on an open hearth and oxidation may be completed in about half an hour of heating time, at about 800° C. Roasting is quick enough to permit the mixture to be oxidized as a traveling stream in a rotary internally fired inclined kiln. After roasting, the oxidized material may be simply cooled and leached. Sodium chromate and calcium chromate go into solution. By an addition of enough sulfuric acid to precipitate, as sulfate, the calcium in solution, a relatively pure solution of sodium bichromate is formed. From it the commercial bichromate can be recovered by evaporation and crystallization.

In a specific example illustrating my process, 100 parts of alloy produced by total reduction of a chromite ore and containing 42 per cent Cr, 48 per cent Fe, 3 per cent Si and 7 per cent C were mixed with 150 parts of lime and 50 parts of sodium carbonate. The metal, lime and soda ash were ground together in a ball mill to 100 mesh and then roasted with free access of air at a temperature kept below 1000° C. This, in this particular instance, was done on an open hearth. In this particular operation, experience shows that in so operating at 800° C. the reaction is vigorous and rapid and 40 parts of the chromium, or 95 per cent becomes soluble in 20 minutes. Longer heating or raising the temperature above 1000° C. reduces the solubility of the furnace product. The roasted material was leached with water and filtered to give a strong solution of sodium-calcium chromate and to this sulfuric acid was added to convert the calcium chromate to chromic acid and thus to form sodium bichromate. Much of the calcium sulfate separated immediately and the remainder separated in the evaporation prior to crystallization as bichromate. Crystallization of the bichromate was carried out in the usual and well known manner.

In a prior Patent 1,926,758, September 12, 1933, I describe and claim a method of making calcium chromate by roasting a mixture of lime and ferrochromium. In the roasting a little soda ash is used as a catalyst, a fraction of a per cent, and it much facilitates the operation. However, to obtain a 90 per cent conversion may require 5 to 20 hours roasting. The roasting product contains calcium chromate and leachings from it, on treatment with sodium carbonate, give a solution of sodium chromate. The leaching also is attended with difficulty. In the present invention, using enough soda in the mix to give half calcium chromate and half sodium chromate, the reaction is very much quicker and no addition of soda ash to the leachings is necessary. On addition of sulfuric acid a solution of sodium bichromate is directly produced.

The beneficial action of soda in the roasting mixture appears to be associated with a wetting action renewing the metal surfaces exposed to the air. There is also a protective action against reversion to chromite exercised by sodium chromate.

The process as described, in comparison with the usual practice of making sodium bichromate from chromite ores, uses only half the soda ash and half the lime and also more than doubles the capacity of a given furnace and leaching plant. In general the consumption of acid is moderate and under control.

What I claim is:

1. In the production of chromate compounds involving oxidation of ferrochromium in finely divided form at an elevated temperature below the fusing temperature of the ferrochromium and in the presence of calcium oxide and sodium carbonate, the improvement which comprises employing sodium carbonate in the amount required to form sodium chromate with about half the chromium of the ferrochromium and employing calcium oxide in an amount in excess of that required to form calcium chromate with the remainder of the chromium of the ferrochromium, thereby to form an oxidized product containing sodium chromate and calcium chromate in about equi-molecular proportions.

2. A chromate production method according to claim 1, in which the oxidized product is leached to produce an aqueous solution containing sodium chromate and calcium chromate in about equi-molecular proportions and the resulting solution is treated with an acid capable of precipitating the calcium of the calcium chromate contained therein, whereby an aqueous solution of sodium bichromate is produced.

MARVIN J. UDY.